(12) United States Patent
Okamura et al.

(10) Patent No.: US 8,746,811 B2
(45) Date of Patent: Jun. 10, 2014

(54) BRAKE FLUID PRESSURE CONTROL DEVICE

(75) Inventors: Koichi Okamura, Nagoya (JP); Chikage Nakamura, Nagoya (JP); Tomoo Harada, Anjo (JP)

(73) Assignees: Advics Co., Ltd., Kariya-Shi, Aichi-Ken (JP); Denso Corporation, Kariya-Shi, Aichi-Ken (JP)

( * ) Notice: Subject to any disclaimer, the term of this patent is extended or adjusted under 35 U.S.C. 154(b) by 165 days.

(21) Appl. No.: 13/532,031

(22) Filed: Jun. 25, 2012

(65) Prior Publication Data

US 2012/0326493 A1 Dec. 27, 2012

(30) Foreign Application Priority Data

Jun. 24, 2011 (JP) ................................. 2011-140955

(51) Int. Cl.
*B60T 8/36* (2006.01)
(52) U.S. Cl.
USPC .......... 303/119.3; 303/DIG. 10; 303/DIG. 11
(58) Field of Classification Search
CPC ............. B60T 8/40; B60T 8/341; B60T 8/36; B60T 13/68; B60T 13/662; B60T 13/66
USPC ................. 303/119.2, 119.3, 116.4, DIG. 10, 303/DIG. 11
See application file for complete search history.

(56) References Cited

U.S. PATENT DOCUMENTS

| 2008/0207391 | A1* | 8/2008 | Ikematsu et al. | 477/28 |
| 2008/0258544 | A1 | 10/2008 | Iyatani | |
| 2011/0231076 | A1* | 9/2011 | Watanabe et al. | 701/70 |

FOREIGN PATENT DOCUMENTS

JP 2008-143202 A 6/2008

* cited by examiner

*Primary Examiner* — Melanie Torres Williams
(74) *Attorney, Agent, or Firm* — Buchanan Ingersoll & Rooney PC (57) ABSTRACT

A brake fluid pressure control device includes: a electromagnetic control valve; a electromagnetic booster valve; a electromagnetic decompression valve; a pump, which are incorporated in a single housing; and an electronic control unit, wherein, the pump draws up at least one of brake fluid, which is supplied from the main reservoir, and brake fluid, which is discharged from the wheel cylinder, and then the pump returns the drawn brake fluid to an area that extends from the electromagnetic control valve of a main flow path up to the electromagnetic booster valve; and a fluid reservoir, which communicates with both the decompression path and an intake port of the pump, and which is arranged inside the housing so that the brake fluid in the fluid reservoir flows toward the intake port of the pump by gravity.

6 Claims, 6 Drawing Sheets

BRAKE FLUID PRESSURE CONTROL DEVICE

CROSS-REFERENCE TO RELATED APPLICATION

This application claims priority from Japanese Patent Application No. 2011-140955 filed on Jun. 24, 2011, the entire subject matter of which is incorporated herein by reference.

TECHNICAL FIELD

This disclosure relates to a brake fluid pressure control device having an automatic brake function that is represented by ESC (Electronic Stability Control) as a sideslip prevention control or TCS (Traction Control System), and more specifically to a brake fluid pressure control device which can improve the responsiveness of an automatic brake even in low-temperature environment or in situations where pipeline resistance of an intake path from a master cylinder to a pump intake port increases.

BACKGROUND

Recently, general brake fluid pressure control devices for a vehicle correspond to not only ABS (Anti-Lock Braking System) but also automatic brake. Such a brake fluid pressure control device is disclosed, for example, in JP-UM-A-2008-143202.

Figure 8:
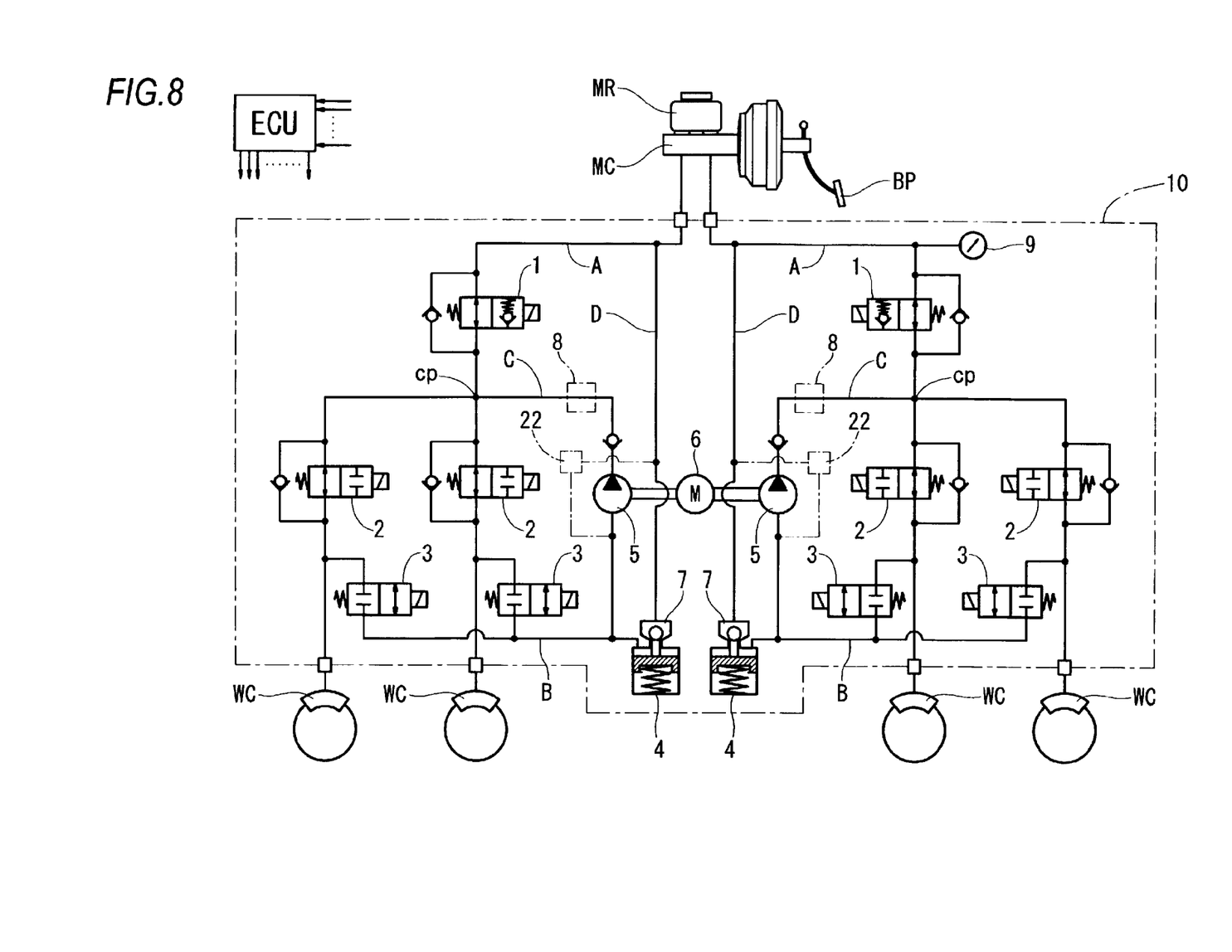
FIG. 8 is a circuit diagram illustrating an example of a brake device to which this disclosure is applied.

An example of a circuit configuration of a fluid pressure brake device that can execute the automatic brake is shown in FIG. 8. In the drawing, reference symbol MC represents a master cylinder, which accompanies a main reservoir MR that reserves brake fluid at atmospheric pressure. In a service brake, by operating a brake pedal BP, the master cylinder MC is operated to generate brake fluid pressure The brake fluid pressure generated by the master cylinder MC (hereinafter referred to as "master cylinder pressure") is supplied to a wheel cylinder WC with passing through a main flow path A to perform the braking. In the main flow path A, an electromagnetic control valve 1 (in the drawing, which is corresponding to a linear electromagnetic valve, and an on/off type cut valve may be used instead of this) having a flow path cutoff function to regulate pressure so that the fluid pressure of the downstream side (the wheel cylinder WC side is considered as the downstream) is increased by a predetermined ratio based on the fluid pressure of the upstream side (master cylinder pressure), and an electromagnetic booster valve 2 are installed.

Further, a decompression path B that passes the brake fluid discharged from the wheel cylinder WC is provided, and an electromagnetic decompression valve 3 and a pressure regulation reservoir 4 are installed in the decompression path B.

In the drawing, a reference symbol 5 represents a pump of which an intake port is connected to the decompression path B, and this pump is driven by a motor 6. A return path C connected to a discharge port of the pump 5 joins between the electromagnetic control valve 1 and the electromagnetic booster valve 2 (a reference symbol cp represents a confluence point).

The pressure regulation reservoir 4 accompanies a pressure response type cut valve 7 that is closed when the brake fluid is introduced, and an intake path D that is connected to the intake port of the pump 5 through the cut valve 7 is provided between the upstream side than the electromagnetic control valve 1 of the main flow path A and the decompression path B.

On the other hand, instead of the pressure regulation reservoir 4 accompanying the cut valve 7, an electromagnetic on/off valve (not illustrated) may be incorporated in the intake path D.

Respective parts of the electromagnetic control valve 1, the electromagnetic booster valve 2, and the decompression valve 3, the pressure regulation reservoir 4, the pump 7, and the cut valve 7 are incorporated in a housing (fluid pressure block) 10 to form a pressure regulation unit. One face of the housing 10 is formed as an electromagnetic valve mount face, and parts of components configuring each electromagnetic valve are incorporated in electromagnetic valve mount holes processed on the housing to open the electromagnetic valve mount face. In the drawing, a reference symbol 8 represents a damper that suppresses pulsation of pump discharge pressure, and a reference symbol 9 represents a pressure sensor, which are installed if needed.

Other parts (electromagnetic coil and the like) of the components configuring the electromagnetic valve project to an outside of the housing 10. According to a general brake fluid pressure control device that is configured by combining the pressure regulation unit and an electronic control unit, the projection portion is covered by the case that accommodates a mount board of an electronic control device (ECU), and a motor for driving the pump is attached to a face opposite the electromagnetic valve mount face.

In the illustrated brake device, the electronic control device ECU determines the necessity of pressure regulation of the wheel cylinder pressure based on information from an acceleration sensor, a wheel speed sensor (not illustrated), and the like, which watch the movement of the vehicle. If it is determined that the pressure regulation is necessary, an operating command is sent from the electronic control device ECU to the electromagnetic control valve 1, the electromagnetic booster valve 2, the electromagnetic decompression valve 3, or the motor 6 to regulate the wheel cylinder pressure.

In the automatic brake control, the brake pedal BP is not operated, and the electromagnetic control valve 1 is closed with the start of the control. If the pump 5 is driven in this state, the pump 5 performs an intake of the brake fluid in the main reservoir MR through the intake path D and a pressure chamber of the master cylinder MC (this chamber communicates with the main reservoir MR when the master cylinder is not operated), and then compresses and discharges the brake fluid. The discharge fluid returns to the main flow path A to be supplied to the wheel cylinder WC, and a friction material presses a rotor so that the fluid pressure to generate a braking force.

SUMMARY

As described above, in the automatic brake control, the brake fluid is supplied from the main reservoir to the motor-driven pump. However, specifically in a large vehicle such as a truck, the fluid pressure control device (hydro unit) may be arranged in the midway of the length direction in a body that is spaced apart from the master cylinder. In this case, the intake path having a length from the main reservoir to the pump is lengthened, so that the intake resistance of the pump is increased.

Accordingly, in a low-temperature environment in which viscosity of the brake fluid (oil) is increased, a fast rising of the pump discharge pressure is not to be expected, and thus the pressing responsiveness in the automatic brake may become insufficient. On the other hand, even if the length of the intake path is short, the pressing responsiveness may become insufficient in case that the environmental temperature is low to cause a great increase of viscosity of the brake fluid.

Accordingly, this disclosure provides at least a brake fluid pressure control device, in which a pressing responsiveness of an automatic brake is increased to suppress a delay of braking from occurring even if a brake device is used in a low-temperature environment or in situations where pipeline resistance of an intake path is high.

In view of the above, a brake fluid pressure control device of this disclosure comprises: an electromagnetic booster valve, which is provided in a main flow path that is extended from a mater cylinder up to a wheel cylinder to open and close the main flow path; an electromagnetic control valve, which is provided on the master cylinder side than the electromagnetic booster valve in the main flow path, and which have a flow path cutoff function; an electromagnetic decompression valve, which is provided in a decompression path that is connected to the wheel cylinder; a pump, which includes an intake port connected to an intake path communicating with a main reservoir and connected to the wheel cylinder through the electromagnetic decompression valve, the pump being driven by a motor; and an electronic control unit, which controls operations of the electromagnetic control valve, the electromagnetic booster valve, the electromagnetic decompression valve, and the pump, wherein the electromagnetic control valve, the electromagnetic booster valve, the electromagnetic decompression valve, and the pump are incorporated in a single housing, and wherein, based on a command from the electronic control unit, the pump draws up at least one of brake fluid, which is supplied from the main reservoir, and brake fluid, which is discharged from the wheel cylinder, and then the pump returns the drawn brake fluid to an area that extends from the electromagnetic control valve of the main flow path up to the electromagnetic booster valve, the brake fluid pressure control device comprises a fluid reservoir, which communicates with both the decompression path and an intake port of the pump, and which is arranged inside the housing so that the brake fluid in the fluid reservoir flows toward the intake port of the pump by gravity. Additionally, the main reservoir is a reservoir that supplies the brake fluid to the master cylinder.

In the above-described brake fluid pressure control device in this disclosure, it is preferable that the all parts of the fluid reservoir may be provided above the pump intake port. However, when a top face of the fluid reservoir is above the pump intake port, a feeding force due to gravity is applied on the reserved fluid in a portion that is positioned on an upper side than the intake port.

In case that only part of the fluid reservoir is placed above the pump intake port, since the fluid reservoir is provided inside the housing and the distance to the pump intake port is extremely short, the drawing up by the pump is expedited as compared with a case where no fluid reservoir is provided.

Additionally, the above-described brake fluid pressure control device may have additional configurations as follows.

a) An extension portion may be formed at a back end of an electromagnetic decompression valve mount hole provided in the housing, and the fluid reservoir may be configured by the extension portion.

b) In the configuration a), an inner diameter of the extension portion at the back end of the electromagnetic decompression valve mount hole may be set to be larger than an inner diameter of the back end of an inlet side than the extension portion of the electromagnetic decompression valve mount hole.

c) An additional hole, which is oriented in a direction crossing a vertical axis that is perpendicular to a axis direction of the electromagnetic decompression valve mount hole, may be provided in a position to avoid a region in which a built-in device is incorporated in the housing, and the additional hole communicates with the intake port of the pump so that the fluid reservoir is formed.

d) A hole may be formed on the housing from a face opposite an electromagnetic valve mount face, the additional hole may be configured by closing an open port of the formed hole with a stopper, and the additional hole communicates with the back end of the electromagnetic decompression valve mount hole so that the fluid reservoir is formed.

e) The fluid reservoir may be configured by at least two of the configurations b), c) and d).

According to the brake fluid pressure control device according to this disclosure, since the fluid reservoir, in which the reserved fluid starts flowing by gravity, is provided on the housing of the pressure regulation unit in which the pump is incorporated, the brake fluid is smoothly supplied from the fluid reservoir to the pump even when an initial operation of the automatic brake.

The fluid reservoir is provided in the housing in which the pump is built, and the distance from the fluid reservoir to the pump is short. Accordingly, while the intake of the brake fluid in the fluid reservoir is performed, the intake resistance of the pump is kept low. In addition, a moving force due to the gravity acts on the brake fluid in the fluid reservoir.

Accordingly, while the brake fluid is supplied from the fluid reservoir, the influence of the increase of the viscosity of the brake fluid or the influence of the distance from the master cylinder to the fluid pressure control device is excluded. Accordingly, even if the device is used in a low-temperature environment or in an environment in which the intake resistance between the master cylinder and the fluid pressure control device is increased, the pump discharge pressure is rapidly increased to improve the pressing responsiveness of the automatic brake.

On the other hand, the electromagnetic decompression valve is typically provided in a position that is most near to the pump intake port. Accordingly, In the configuration a) where the extension portion is formed at the back end of the electromagnetic decompression valve mount hole and the fluid reservoir according to this disclosure is configured by the extension portion, the pipeline resistance from the fluid reservoir to the pump intake port becomes lower enough to disregard it, and thus the effect according to this disclosure can be achieved.

Further, since a relatively large space is produced between the back end of the electromagnetic decompression valve mount hole to the face opposite the electromagnetic valve mount face of the housing and the fluid reservoir is configured by effectively using the space, the increase of a volume of the housing due to the installation of the fluid reservoir is to be avoided.

In the configuration b) where the inner diameter of the extension portion of the electromagnetic decompression valve mount hole is set to be larger than the inner diameter of the back end of the mount hole at the inlet side than the extension portion, the volume of the fluid reservoir can be increased while the increase of a volume of the housing is avoided.

Further, In the configuration c) where the additional hole is formed in a position to avoid the region in which the built-in device is to be incorporated in the housing, and the fluid reservoir is configured by the additional hole, the space in a position separated from the position of the electromagnetic valve mount hole inside the housing, can be effectively used, and a intended fluid reservoir can be formed even when s margin to extend the back end of the electromagnetic valve mount hole in the housing is not sufficient. Further, in case that the length of the extension portion is restricted and it is unable to make the fluid reservoir with sufficient volume by only the extension portion, an auxiliary fluid reservoir may be formed in a region that is different from the extension portion to supplement the shortage of volume of the fluid reservoir configured as the extension portion.

In the configuration d) where the hole is formed on the housing from the face opposite the electromagnetic valve mount face, as the additional hole and the fluid reservoir is formed using this formed hole, the fluid reservoir having a large volume can be formed by setting the inner diameter of the hole that forms the fluid reservoir to be larger than the inner diameter of the back end of the electromagnetic decompression valve mount hole, without performing a recess process.

In addition, In the configuration e) of the combination of b) to d) cases, the degree of freedom in the design of the fluid reservoir (selection of an installation point or selection of the size) is increased.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
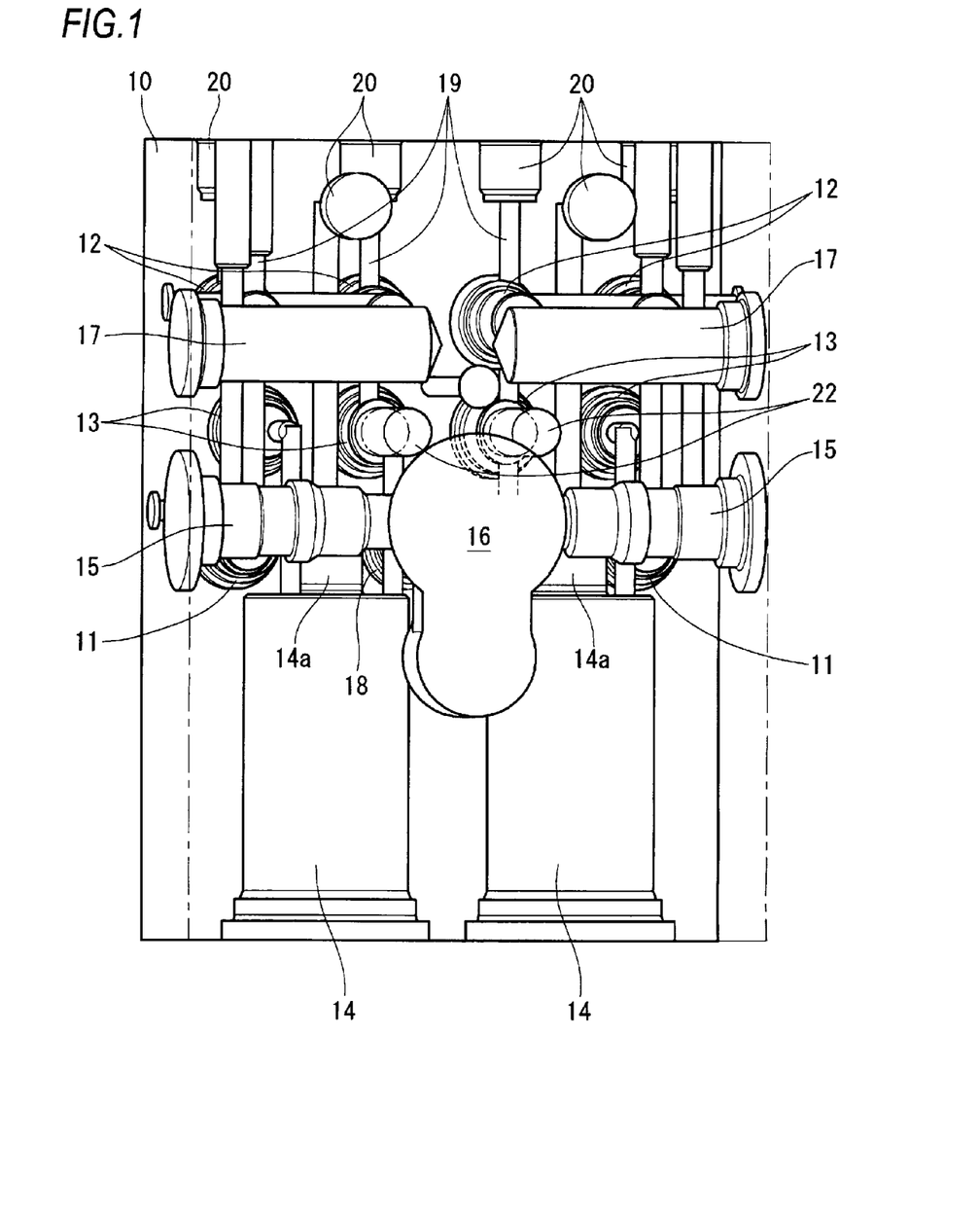
FIG. 1 is a perspective view illustrating an example of an inside of a housing of a pressure regulation unit in a brake fluid control device according to this disclosure.
Figure 2:
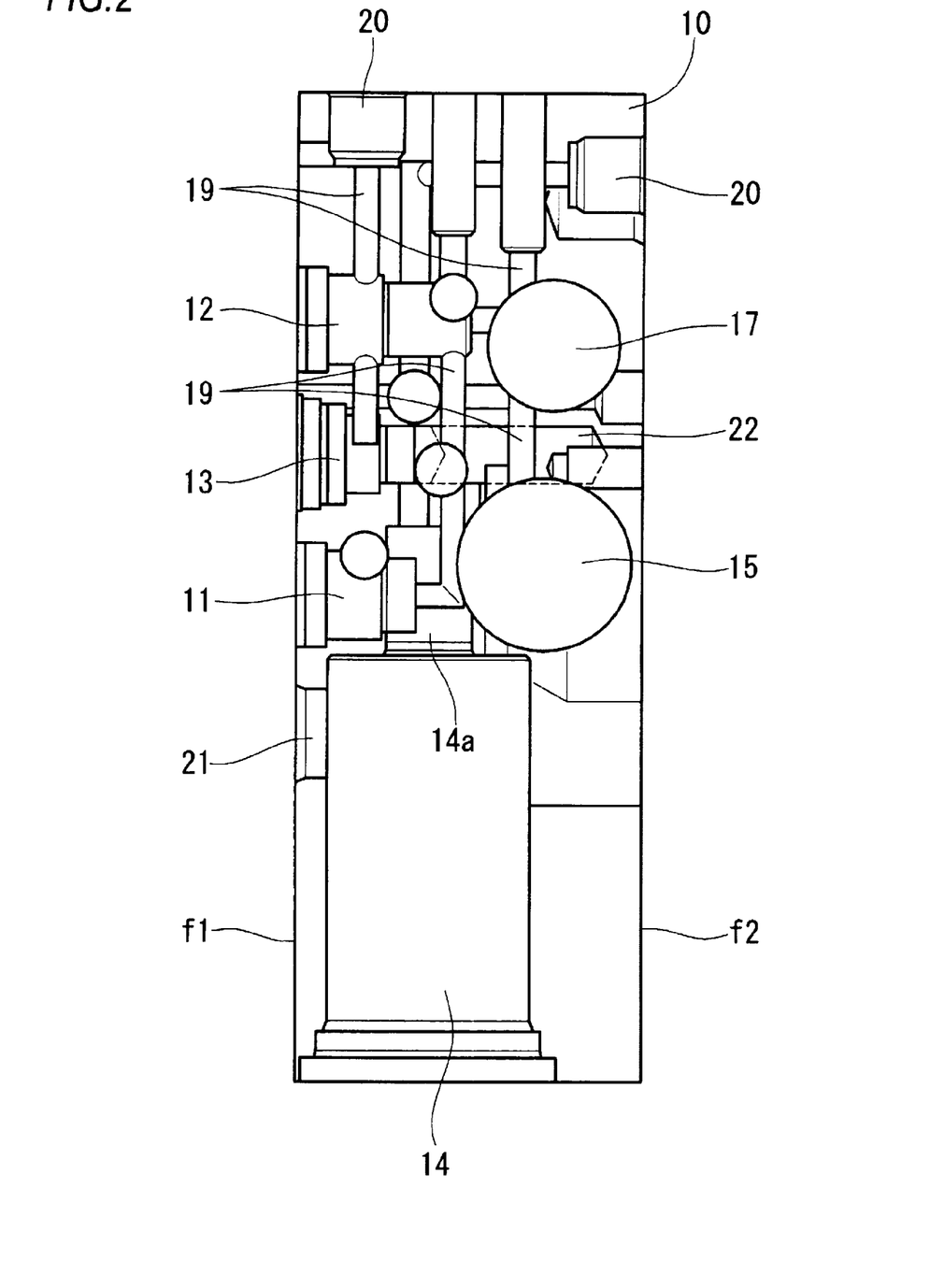
FIG. 2 is a side view illustrating an inside of a housing of FIG. 1.
Figure 3:
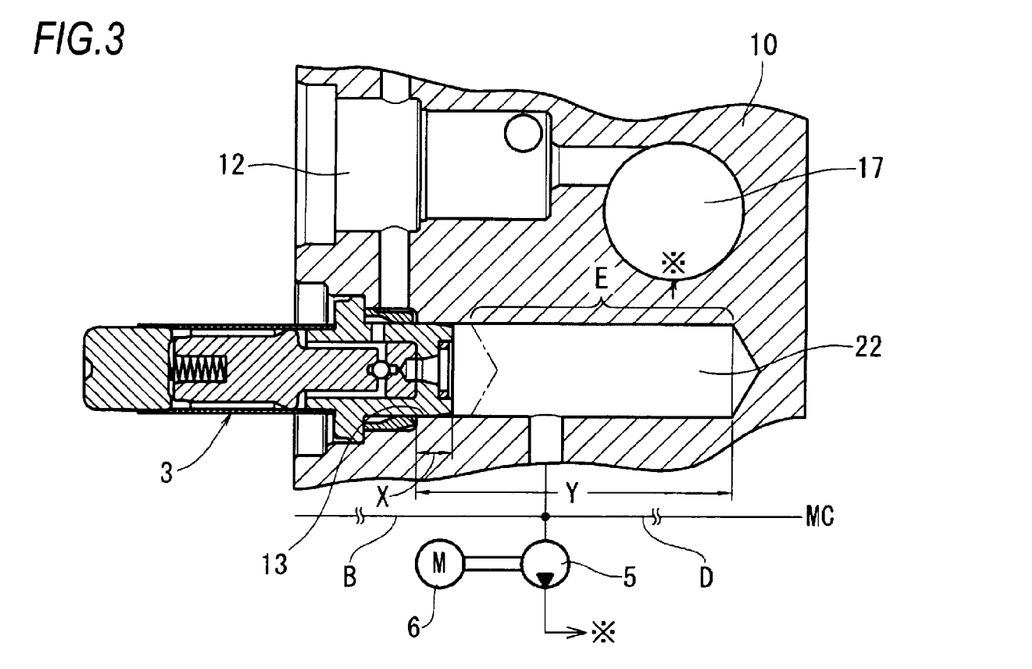
FIG. 3 is a cross-sectional view illustrating one example of a fluid reservoir according to this disclosure.

Hereinafter, a brake fluid pressure control device according to embodiments of this disclosure will be described with reference to FIGS. 1 to 7. Components according to a first embodiment are shown in FIGS. 1 to 3. A housing 10 of a pressure regulation unit is shown in FIGS. 1 and 2.

The illustrated housing 10 is for a brake device based on a circuit configuration of FIG. 8, and includes an electromagnetic control valve mount hole 11, an electromagnetic booster value mount hole 12, an electromagnetic decompression value mount hole 13, a reservoir hole 14, a pump assembly hole 15, a cam chamber 16, a hole 17 for configuring a damper, a pressure sensor mount hole 18, flow path holes 19 for forming a part of a main flow path A described with reference to FIG. 8, a decompression path B, a return path C, and an intake path D, a connection port 20 connecting an internal circuit to a master cylinder and a wheel cylinder, and a terminal insertion hole 21 for passing a power feeder line to a motor.

In the electromagnetic control valve mount hole 11, components configuring an electromagnetic control valve 1 of FIG. 8 are incorporated. Further, components configuring an electromagnetic booster valve 2 of FIG. 8 is incorporated in the electromagnetic booster value mount hole 12, and components configuring an electromagnetic decompression valve 3 of FIG. 8 is incorporated in the electromagnetic decompression valve mount hole 13. Further, components (a piston and a spring that urges the piston) configuring a pressure regulation reservoir 4 are inserted into a reservoir hole 14.

Further, a plunger pump (components thereof) is incorporated in an oppositely arranged pump assembly hole 15, and an eccentric cam that pushes to move a plunger of the plunger pump is arranged in a cam chamber 16.

The respective electromagnetic valve mount holes 11 to 13 are formed on an electromagnetic valve mount face f1 of the housing 10. Further, a motor 6 in FIG. 8 is fixed to a face f2 (motor attachment face in the drawing) that is opposite the electromagnetic valve mount face f1, and the eccentric cam in the cam chamber 16 is rotated by the motor. A return force from a spring is applied to the plunger of the plunger pump, and then pressing by the eccentric cam and returning by the spring force are repeatedly performed to cause the pump to draw up the brake fluid.

The hole 17 for configuring a damper is used when a damper 8 is incorporated in a discharge path (return path C in FIG. 8) of the pump, if necessary. The hole 17 for configuring the damper is provided in the device having the damper.

In the pressure sensor mount hole 18, a pressure sensor for detecting an output pressure of the master cylinder is incorporated. On the other hand, if the device has an electromagnetic on/off value installed in the intake path D in FIG. 8, the device does not require a cut valve 7 in FIG. 8. Accordingly, the hole, in which the cut valve 7 is incorporated (hole formed at a back end of the reservoir hole 14a in FIGS. 1 and 2), is not provided in the device. However, in the following description, it is exemplified that the reservoir hole 14 is provided together with the hole 14a, and that the fluid pressure control device is used in a state that the reservoir hole 14 keeps a posture to direct downward (ground side).

The details of a illustrative example of the electromagnetic decompression valve mount hole 13 in FIGS. 1 and 2 are shown in FIG. 3. Generally, the electromagnetic decompression valve mount hole 13 is formed so that a back end of the mount hole is corresponding to a dashed line in FIG. 3. An extension portion E is formed at the back end of the electromagnetic decompression value mount hole 13 to extend toward back side, and the fluid reservoir 22 is configured by the extension portion E.

It is preferable that the length relationship between X and Y in FIG. 3 satisfies Y/X>3. In this embodiment, the reference symbol X represents a length in the axis direction of a portion of the electromagnetic decompression valve mount hole 13, in which the front end of the electromagnetic decompression valve 3 is pressingly inserted or is inserted with sealing between the upstream side and the downstream side of the valve, and a the reference symbol Y represents a length in the axis direction of a portion of the electromagnetic decompression valve mount hole 13 which has the same diameter as the portion that corresponds to the length X).

The fluid reservoir 22 communicates with both the decompression path and the pump intake port, and the fluid reservoir 22 is in the position in which the brake fluid in the fluid reservoir 22 flows by gravity toward the pump intake port (for example, it is provided on the top face of the pump assembly hole 15). In the illustrated case, the overall fluid reservoir 22 is placed above the pump intake port. However, even in the structure in which a part of the fluid reservoir 22 is placed above the pump intake port, a moving force due to gravity effects on the brake fluid in the fluid reservoir to flow the brake fluid.

Additionally, in the case of providing the cut valve 7 such as this embodiment, in order to prevent the path having the fluid reservoir 22 from being the path going round the cut valve 7, the fluid reservoir 22 communicates with any one of a portion on the master cylinder MC side than the cut valve 7 and a portion on the intake port of the pump 5 side than the cut valve 7 in the fluid pressure path (for example, the intake path D), which makes the master cylinder MC and the intake port of the pump 5 communicate with each other through the cut valve. In case that the automatic brake is executed, the cut valve 7 is opened (it is closed when the brake operation is performed by a driver and the fluid pressure occurs in the master cylinder MC), and it may be communicate with any one of the two places.

Figure 4:
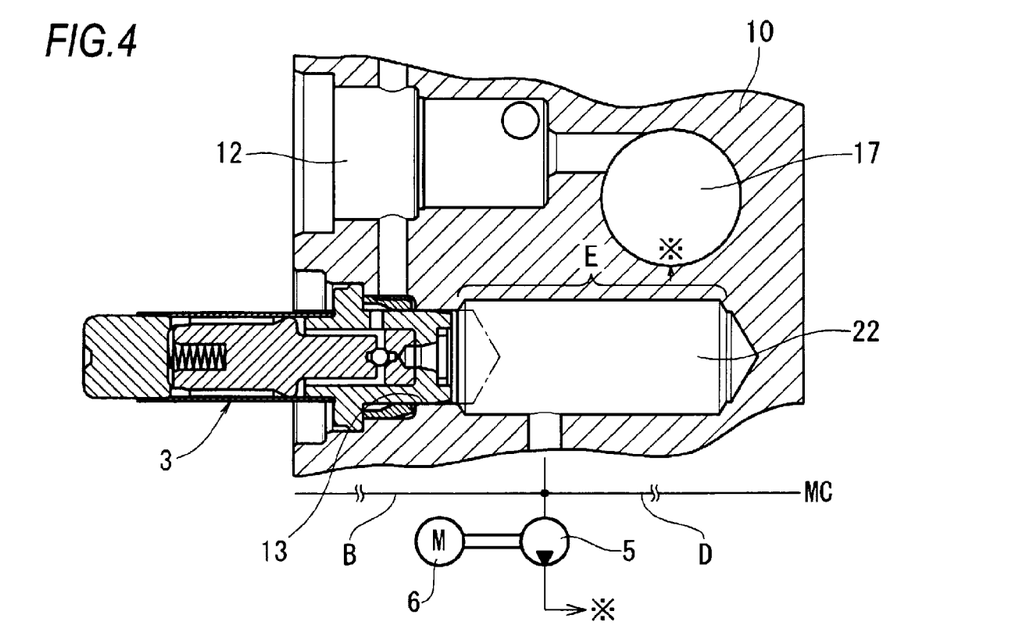
FIG. 4 is a cross-sectional view illustrating another example of a fluid reservoir according to this disclosure.

FIG. 4 a cross-sectional view illustrating another illustrative example of the electromagnetic decompression valve mount hole 13. According to the example of FIG. 4, similarly to the example of FIG. 3, an extension portion is formed at the back end of the electromagnetic decompression value mount hole 13, and the fluid reservoir 22 is configured by the extension portion. However, the extension portion formed at the back end of the electromagnetic decompression value mount hole 13 is a recess-processed hole, and the inner diameter of the extension portion is set to be larger than the inner diameter of a back end of an inlet side than the extension portion E of the electromagnetic decompression valve mount hole 13 (in other words, the inner diameter of the portion to which the most back end of the components configuring the electromagnetic decompression valve 3 is fitted). Accordingly, the fluid reservoir having a larger volume than that according to the example of FIG. 3 can be formed using a space in the housing 10.

Figure 5:
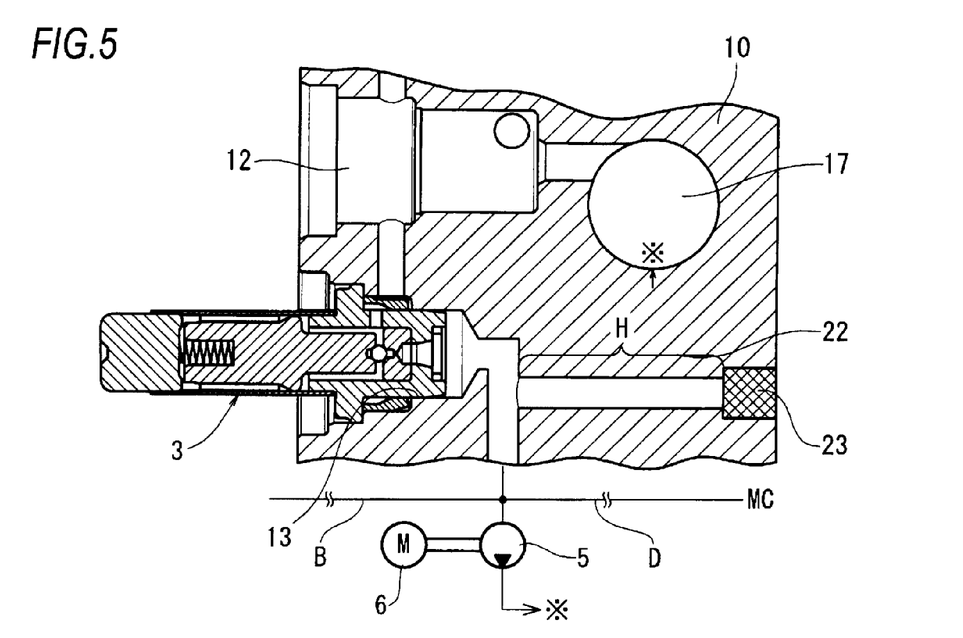
FIG. 5 is a cross-sectional view illustrating still another example of a fluid reservoir according to this disclosure.
Figure 6:
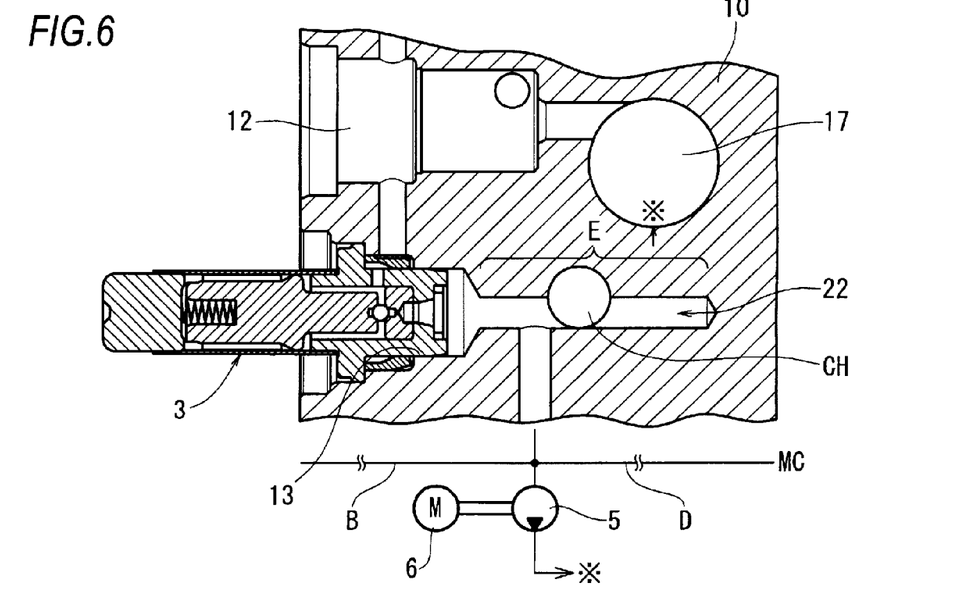
FIG. 6 is a cross-sectional view illustrating yet still another example of a fluid reservoir according to this disclosure.

FIGS. 5 and 6 show other illustrative examples of the electromagnetic decompression valve mount hole 13. According to the example of FIG. 5, an additional hole H is provided in a position to avoid a region in which a built-in device is incorporated in the housing 10, and the fluid reservoir 22 is formed so that the additional hole H communicates with the intake port of the pump.

The additional hole H is a hole in the direction that crosses a vertical axis that is perpendicular to an axis direction of the electromagnetic decompression valve mount hole. The direction of the additional hole may be formed in a direction that is parallel to or orthogonal to the electromagnetic decompression valve mount hole 13. According to the example, a target fluid reservoir can be formed using the space in a position separated from the position of the electromagnetic valve mount hole inside the housing 10.

Here, the additional hole H is formed by processing the face f2 that is opposite the electromagnetic valve mount face of the housing 10 and closing the open end of the hole with a stopper 23. According to this structure, the fluid reservoir having a large volume can be formed by processing the additional hole having the inner diameter that is larger than the inner diameter of the back end of the electromagnetic decompression valve mount hole 13, without performing a recess process.

According to the example of FIG. 6, the additional hole H is provided in the position to avoid the region in which the built-in device is incorporated in the housing 10, and the fluid reservoir 22 is formed so that the additional hole H communicates with the intake port of the pump. Here, the additional hole H is a combined hole that is configured by the extension portion E formed at the back end of the electromagnetic decompression valve mount hole 13 and a cross hole CH provided to cross the extension portion. If a space in which the cross hole CH can be formed is present inside the housing 10, the fluid reservoir 22 can be formed by processing the additional hole.

According to the example using the additional hole, in case that the length of the extension portion that is formed in the electromagnetic decompression valve mount hole is restricted and it is unable to make the fluid reservoir with sufficient volume by only the extension portion, an auxiliary fluid reservoir may be configured in a region that is different from the extension portion effectively using the space in a position that separated from the electromagnetic valve mount hole inside the housing 10, and thus it is possible to supplement the shortage of volume of the fluid reservoir that is configured as the extension portion through the installation of the auxiliary fluid reservoir.

On the other hand, the above-described fluid reservoir may be configured by combining two or more different kinds of fluid reservoirs as exemplified above, and the degree of freedom increase in the design of the fluid reservoirs by the combination thereof.

A performance evaluation test was performed with respect to a trial product (having the fluid reservoir 22 in FIG. 4) of the brake fluid pressure control device according to this disclosure. In the test, automatic brake was performed under the condition of an environmental temperature of −20° C. by using the device of this disclosure and the brake fluid pressure control device (in the related art), in which the fluid reservoir according to this disclosure is not provided. As a result, as shown as a dotted line in FIG. 7, the fluid pressure of the wheel cylinder according to the related art device was slowly increased at almost a constant speed.

Figure 7:
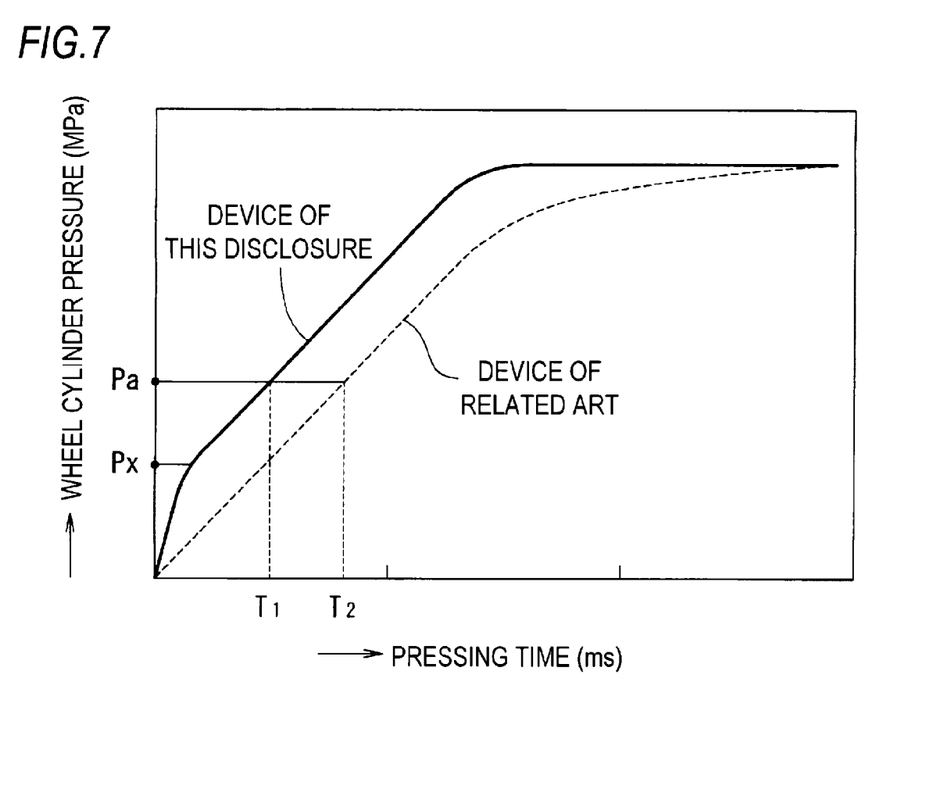
FIG. 7 is a graph illustrating a booster test results.

By contrast, according to the device according to this disclosure, as shown as a solid line, the fluid pressure of the wheel cylinder was rapidly increased up to the fluid pressure Px (MPa) (at that time, the supply of the brake fluid was performed from the fluid reservoir). Until the fluid pressure reached the target pressure Pa (MPa), the related art device requires $T_2$ (ms). On the other hands, the device of this discloser requires $T_1$ (ms) that was faster than $T_2$ (ms). As described above, the effectiveness of providing the fluid reservoir, in which the brake fluid flows by gravity with respect to the pump intake port, in the housing incorporating the pump is confirmed.

What is claimed is:

1. A brake fluid pressure control device comprising:
   an electromagnetic booster valve, which is provided in a main flow path that is extended from a mater cylinder up to a wheel cylinder to open and close the main flow path;
   an electromagnetic control valve, which is provided on the master cylinder side than the electromagnetic booster valve in the main flow path, and which have a flow path cutoff function;
   an electromagnetic decompression valve, which is provided in a decompression path that is connected to the wheel cylinder;
   a pump, which includes an intake port connected to an intake path communicating with a main reservoir and connected to the wheel cylinder through the electromagnetic decompression valve, the pump being driven by a motor; and
   an electronic control unit, which controls operations of the electromagnetic control valve, the electromagnetic booster valve, the electromagnetic decompression valve, and the pump, wherein the electromagnetic control valve, the electromagnetic booster valve, the electromagnetic decompression valve, and the pump are incorporated in a single housing, and wherein, based on a command from the electronic control unit, the pump draws up at least one of brake fluid, which is supplied from the main reservoir, and brake fluid, which is discharged from the wheel cylinder, and then the pump returns the drawn brake fluid to an area that extends from the electromagnetic control valve of the main flow path up to the electromagnetic booster valve; and a fluid reservoir, which communicates with both the decompression path and an intake port of the pump, and which is arranged inside the housing so that the brake fluid in the fluid reservoir flows toward the intake port of the pump by gravity.

2. The brake fluid pressure control device according to claim 1, wherein an extension portion is formed at a back end of an electromagnetic decompression valve mount hole provided in the housing, and the fluid reservoir is configured by the extension portion.

3. The brake fluid pressure control device according to claim 2, wherein an inner diameter of the extension portion at the back end of the electromagnetic decompression valve mount hole is set to be larger than an inner diameter of the back end of an inlet side than the extension portion of the electromagnetic decompression valve mount hole.

4. The brake fluid pressure control device according to claim 1, wherein an additional hole, which is oriented in a direction crossing a vertical axis that is perpendicular to an axis direction of the electromagnetic decompression valve mount hole, is provided in a position to avoid a region in which a built-in device is incorporated in the housing, and the additional hole communicates with the intake port of the pump so that the fluid reservoir is formed.

5. The brake fluid pressure control device according to claim 4, wherein a hole is formed on the housing from a face opposite an electromagnetic valve mount face, the additional hole is configured by closing an open port of the formed hole with a stopper, and the additional hole communicates with the back end of the electromagnetic decompression valve mount hole so that the fluid reservoir is formed.

6. The brake fluid pressure control device according to claim 1, wherein the fluid reservoir is selected at least two configurations from the group including:

the fluid reservoir configured by setting an inner diameter of the extension portion at a back end of the electromagnetic decompression valve mount hole to be larger than an inner diameter of the back end of valve mount hole at an area except for the extension portion;

the fluid reservoir configured by forming an additional hole, which is oriented in a direction crossing a vertical axis that is perpendicular to a axis direction of the electromagnetic decompression valve mount hole, in a position to avoid a region in which a built-in device is incorporated in the housing, and communicating the additional hole with the intake port of the pump so that the fluid reservoir is formed; and the fluid reservoir configured by forming an additional hole on the housing from a face opposite the electromagnetic valve mount face, closing an open port of the additional hole with a stopper, and communicating the additional hole with the back end of the electromagnetic decompression valve mount hole so that the fluid reservoir is formed.

* * * * *